April 28, 1931.  F. E. BEST  1,802,803
DEVICE FOR TRANSMITTING VISION ELECTRICALLY
Original Filed Jan. 7, 1926  2 Sheets-Sheet 1
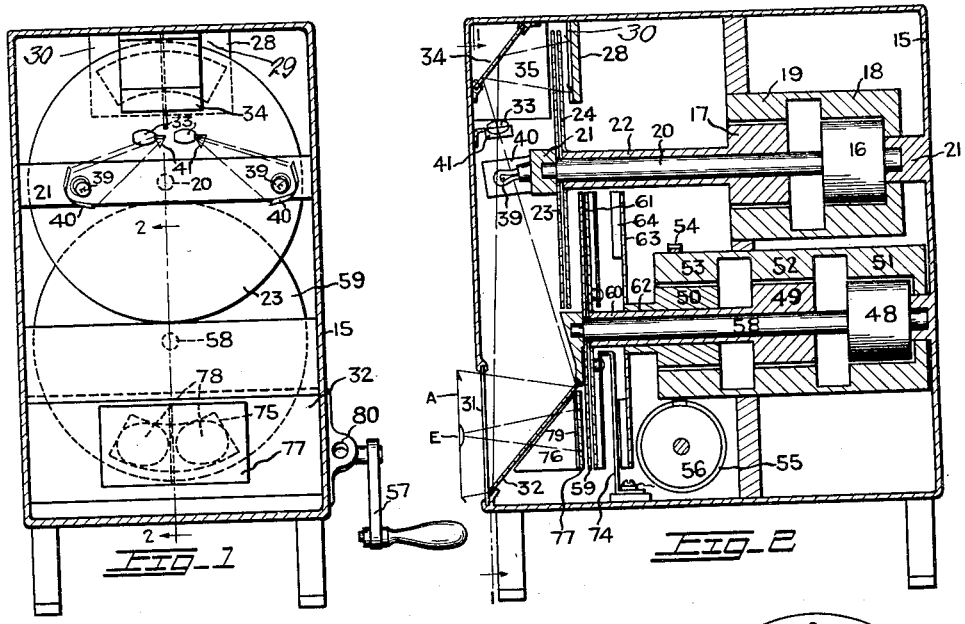
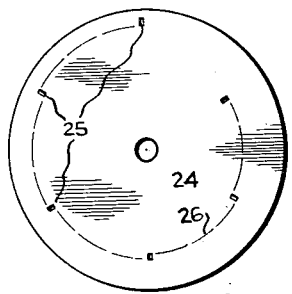
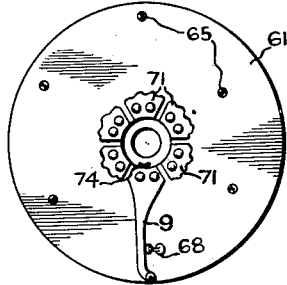
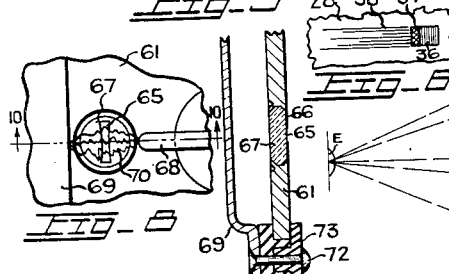
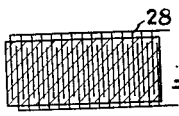
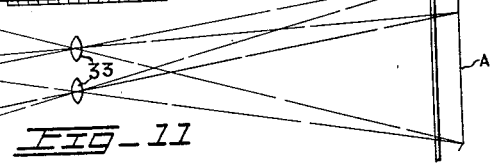
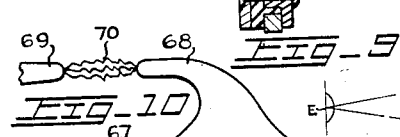
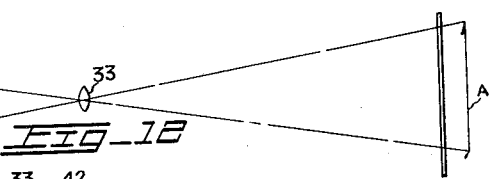
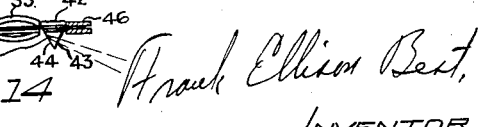
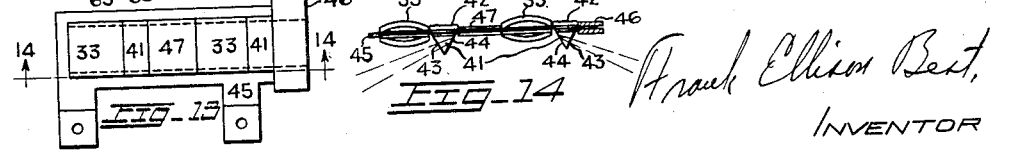
Frank Ellison Best,
INVENTOR April 28, 1931.    F. E. BEST    1,802,803
DEVICE FOR TRANSMITTING VISION ELECTRICALLY
Original Filed Jan. 7, 1926    2 Sheets-Sheet 2

INVENTOR
Frank Ellison Best

Patented Apr. 28, 1931

1,802,803

UNITED STATES PATENT OFFICE

FRANK ELLISON BEST, OF SEATTLE, WASHINGTON

DEVICE FOR TRANSMITTING VISION ELECTRICALLY

Refile of application Serial No. 79,809, filed January 7, 1926. This application filed March 1, 1928.
Serial No. 258,347.

My invention is a refiling of application Ser. No. 79,809, filed January 7, 1926, and relates to improvements in television devices and the object of my invention is to provide a simple and efficient means for producing instantaneous life-like motion picture reproduction at a distance.

Another object is to provide a television device in which only one photo-electric, or selenium cell is used in transmitting an animated or moving picture, and in which the picture so transmitted, may be received without the use of any photo-electric cell or cells.

Another object is to provide a method of overcoming the blurring effects of television pictures due to the sluggish recuperation of the photo electric cell by providing a strong uniform light that falls in a narrow beam across the wake, just to the rear of the fluctuating and traveling picture light, producing a photo electric status in the cell, analogous to a faint flickering comet head followed immediately by a strong uniformly brilliant secondary comet with its nonflickering fading tail, the only current varying light being the first flickering picture light, since the sum total of the secondary comet and its tail recuperations at all times is constant and offers constant electrical resistance.

A further object is to provide efficient synchonizing means for the sending and receiving apparatus.

Another object is to provide television device of this nature in which a sending and a receiving device is combined into a single instrument.

Other objects are to provide in connection with television devices of this nature, means for reproducing natural color effects and means for preserving in the picture the stereoscopic or third dimension effect.

Further objects are to provide devices of this nature that are capable of operating in connection with standard radio-transmitting and receiving apparatus.

A further object is to provide means for damping out a light instantaneously in connection with devices of this nature.

Other and more specific objects will be apparent from the following description taken in connection with the accompanying drawings.

In the drawings Fig. 1 is a somewhat diagrammatic sectional view on broken line 1—1 of Fig. 2 of television transmitting and receiving apparatus constructed in accordance with my invention parts of the same being shown in elevation and other parts being shown dotted.

Fig. 2 is a view in vertical mid section substantially on broken line 2—2 of Fig. 1.

Figs. 3, 4 and 5 are detached views in elevation of certain shutter discs, a portion only of the openings being shown in the disc of Fig. 4, and parts that are connected with the disc of Fig. 5 being broken away. Fig. 4 shows disc 23 drawn to a larger scale than is used in Figs. 3 and 5.

Fig. 6 is a diagrammatic view illustrating the manner of directing the impression light and masking light onto the photo-electric cell of the sending apparatus.

Fig. 7 is a somewhat diagrammatic sectional view of a photoelectric or selenium cell.

Fig. 8 is a fragmentary plan view on an enlarged scale illustrating parts of the lighting apparatus used in connection with the receiving mechanism.

Fig. 9 is an enlarged fragmentary sectional view of parts of said lighting apparatus.

Fig. 10 is a fragmentary sectional view substantially on broken line 10—10 of Fig. 8.

Figs. 11 and 12 are diagrams in plan and in side elevation respectively illustrating the projection of an image.

Fig. 13 is a detached view in elevation of certain lenses and prisms for the projection of an image and a blotting out light showing the same in a frame.

Fig. 14 is a sectional view substantially on broken line 14—14 of Fig. 13 showing parts in elevation.

Figure 15:
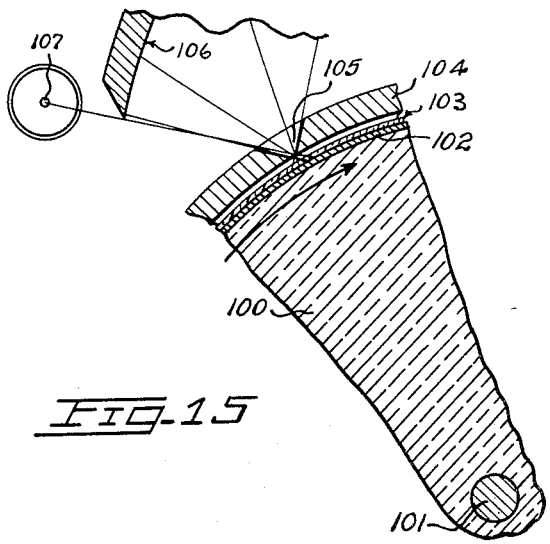

Fig. 15 as a fragmentary sectional view showing a wake masking light applied to a rotating photo-electric cell.

Like reference numerals designate like parts throughout the several views.

In the drawings 15 is a rectangular case forming a housing for a duplex television device constructed in accordance with my invention, said device embodying both sending and receiving apparatus.

The sending apparatus

Disposed within the housing 15 is a duplex two pole synchronous motor embodying two rotors 16 and 17 and two stators 18 and 19. The rotor 16 is secured to a shaft 20 that is journalled in bearings 21 and the rotor 17 is secured to a tubular shaft 22 that is rotatable on shaft 20. Two discs 23 and 24 are secured to the forward ends of shafts 20 and 22 respectively. The two rotors 16 and 17 are driven at different uniform speeds that bear a constant ratio relative to each other so as to produce a constant uniform shifting of the angular positions of the two discs relative to each other, as for instance, the disc 24 may gain one fifteenth of a revolution on the disc 23 while said disc 23 is making one complete revolution. Obviously the ratio of the angular velocity of the two discs is optional.

The disc 24 is provided with a plurality of slots 25 arranged at equi-angular distances preferably with their longer dimension extending radially said slots forming a spiral with the outermost edge of one slot always at the same radial distance as the innermost edge of an adjacent slot as illustrated by arcs 26 and Fig. 3.

Figure 4:
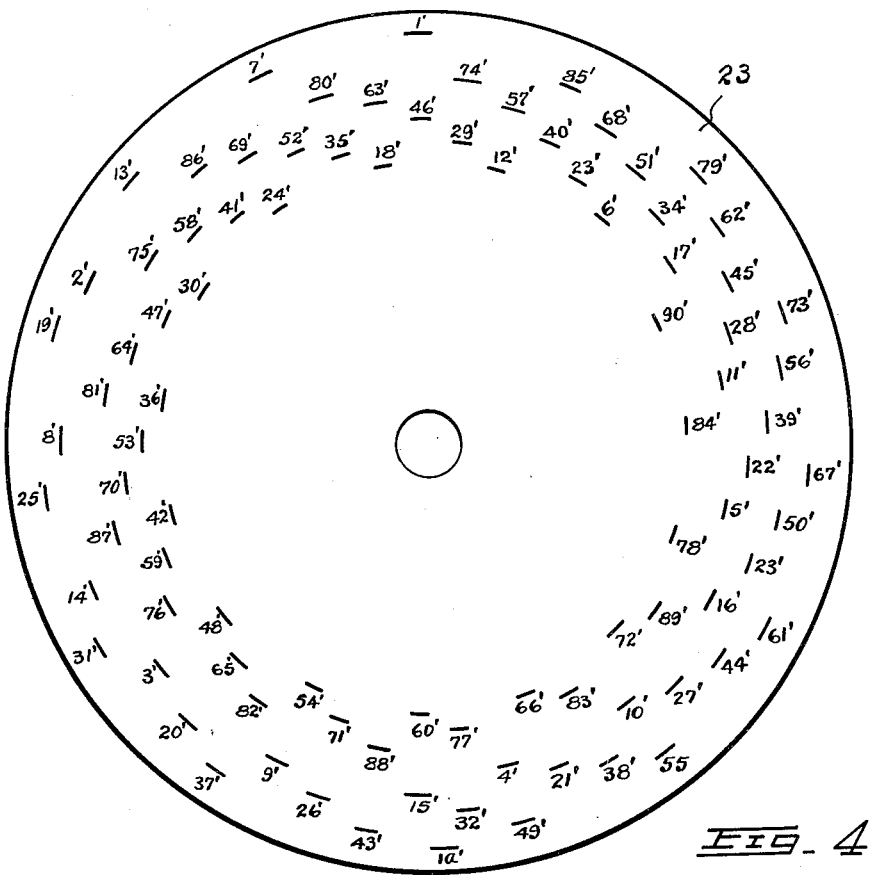

The disc 23 is provided with a plurality of relatively long narrow slots 1′ to 90′, Fig. 4, arranged in such a manner that as the two discs 23 and 24 are rotated at different speeds said slots 1′ to 90′ will register in numerical order with successive slots 25 of disc 24, forming successive crosses that permit a pencil of light to pass through the discs at a shifting and rapidly moving intersection and thence through color filters 29 and 30 onto a photo-electric or selenium cell 28. As one scanning pencil of light leaves cell 28 another begins its traverse until the whole area is scanned to complete the scanning cycle, which must be completed within a small fraction of a second to give the impression of a continuous picture.

Where a single-pole motor is used and the disc 23 may run in either of two positions relative to disc 24, offset by an angle of 180 degrees, I prefer to duplicate the set of slots just disclosed on the disc 23, beginning the second series at 1A—at the bottom of the disc instead of at 1′—at the top of the disc. It will be seen that these slots will not interfere with each other and are simply a duplication of slots diametrically opposite each to each so that no matter how the motor may pick up the slots the two discs, 23 and 24, will always register properly.

It will be noted that while the scanning lines are finely drawn and the whole area covered in each scanning cycle, yet no two contiguous lines are scanned successively but substantial distances separate successively scanned lines to permit the pencil of light to spread out after passing through the focal point, which is at the discs, and cover a larger area of the cell 28 without overlapping the last scanned line, allowing greater time for the cell to recuperate before the affected area is used again.

The image, as of the arrow A, that is projected onto the photo-electric cell passes first through an opening or transparency 31 in the front wall of housing 15, then falls on, angularly disposed mirror 32, is reflected upwardly through lenses 33 onto other angular mirror 34, from which said image is reflected in reversed position and line by line as hereinbefore described through the slots 25 and 1′— to 90′— thence through color filters 29 and 30 onto the photo-electric cell 28. In Figs. 11 and 12 I have shown two diagrams illustrating the manner in which this image is projected and is seen by the eye, Fig. 11 being in plan and Fig. 12 being in side elevation. From these diagrams it will be seen that two images of the arrow A. as seen from different points spaced apart transversely corresponding to the spacing of the human eyes projected in reversed position on the photo-electric cell 28. These images are transmitted and are seen in this relation in a rectified position, as hereinafter explained and as illustrated in the diagrams, to give to the person seeing the same the advantage of a perspective or stereoscopic view as in actual vision. A partition plate 35 is provided in connection with mirror 34 and just above and mid way between lenses 33 to prevent overlapping of the images from the two lenses.

The photo-electric or selenium cell 28 may be made up of a plurality of electrodes embodied in a body of selenium or other metal capable of changing its electrical conductivity under the action of light so that as a line of light is drawn across said cell its conductivity will vary in proporton to the intensity of the light and the current flowing through said cell will be proportionately varied. The variable current thus produced may be transmitted or may be amplified and transmitted by conventional radio transmitting or sending apparatus and may be received by the use of conventional radio receiving apparatus and reconstructed into a picture as hereinafter described.

It is a property of selenium and photo-electric cells that there is a slight lag in the cell in coming back to normal conductivity after a light has passed thereover and it is an important feature of this invention to eliminate what otherwise might be a troublesome effect due to this lag. This is done by providing a light of constant intensity adjacent to the pencil of picture light which is defined, as is the picture light by the scanning aperture in the two discs. The rays of these two lights cross each other at the aperture common to both and fall on the photo electric cell adjacent but on opposite sides relative to their relation before passing through the discs.

The pencil of constant intensity light follows in the wake of the pencil of varying picture light on the photo electric cell. This is necessary to the production of a clear picture, since a very small fraction of a second is required for the cell to recuperate to normalcy after the light is removed. This recuperating wake varies since the light causing it varies and therefore affects the carrier current and as a result blurs the picture. This strong uniform following light with its constant recuperating wake of constant electrical resistance masks this fluctuating wake of fluctuating resistance with the net result that the only fluctuating light impression in the cell is that which comes directly under the impression of the varying picture light itself, and all recuperative reactions of this varying picture light are brought by addition of a complementary light impression to a uniform state causing uniform electrical resistance. Thus the effect of the recuperative lag is blotted out. For instance, referring to Fig. 6, 28 is the photo-electric cell, 36 indicates diagrammatically the impression light of less intensity traveling from left to right and 37 indicates the wake masking light of greater intensity following in the wake of the impression light over the path indicated by shading 38.

The wake masking light emanates from lamps 39 positioned within reflectors 40 that serve to direct the wake masking light through prisms 41, Figs. 1, 2 and 14 disposed beside the lenses 33. The front side 42 of the prisms 41 is preferably of ground glass, the side 43 of said prisms through which the light enters is clear and the third side 44 of said prisms is mirrored to reflect the light out through the ground glass. The wake masking light from the ground glass side of the prisms, emanating from a different source than the light or image transmitted through lenses and passing through the same small opening in discs 23 and 24 will fall on the photo electric cell just back of the impression light thus masking the effect of the impression light and leaving any area of the photo electric cell in substantially the same condition relative to conductivity as it was before the impression light passed thereover. The wake masking light on the cell will always be constant so that its effect on the conductivity of the cell will always be the same. The impression light being the only variable light element will vary the conductivity of the cell in proportion to its intensity.

In Fig. 15 I have shown a wake masking light applied to a moving photo electric cell. In this figure 100 designates a rotor rotatably mounted on axis 101 and having a peripheral layer of photo electric material 102 covered by a transparent band 103. This rotor is disposed within an opaque housing 104 having small opening 105 through which a variable picture light may be reflected by a mirror 106. A wake masking light 107 of relatively great intensity as compared to the variable picture light is arranged to direct a beam of light through the small opening 105 so that it will fall on the photo electric material in the wake of the variable picture light when the cell is rotated in the direction indicated by the arrow thus always restoring the photo-electric cell to a state of uniform conductivity.

For convenience in assembly and handling, the lenses 33 and prisms 41 are each provided on two opposite sides with a V shaped groove and are adapted to be slipped into a frame 45 and secured therein by clip means 46. A spacer 47 is provided between one lens 33 and the adjacent prism 41. The frame 45 is adapted to be secured to the front wall of the housing 15.

*The receiving apparatus*

The receiving apparatus consists of a triple motor embodying three rotors 48, 49 and 50 with their respective stator or stators 51, 52 and 53, all of which are relatively rigid for movement simultaneously. The stators 51, 52 and 53 are adapted to be adjusted from the outside of the housing 15 by means of worm wheel 54, and worm 55 on shaft 56 that has crank 57 on the outer end thereof. These motors are also of the synchronous type adapted to run at relatively constant speeds and at exactly the same speeds as the motors of the sending apparatus. The rotor 48 is secured to a shaft 58 which carries at its forward end a disc 59 that is an exact duplicate of the hereinbefore described disc 23. The rotor 49 is secured to a tubular shaft 60, Figs. 5, 8 and 9 that carries a disc 61 disposed immediately in rear of disc 59. The discs 59 and 61 are driven at different speeds but the ratio of said speeds is constant as described in connection with discs 23 and 24.

We here show a device with both transmitting and receiving units in proper relation to each other to make it possible for a person in any setting to see and be seen at the same time. Thus two people at distant points, if provided with complete devices as shown, can see each other at the same time, and if they are provided with regular radio broadcasting and receiving appliances can hear each other at the same time as well.

Of course it is also contemplated that these units may be separated for transmitting or receiving only.

The adjustment of the stators in the receiving apparatus by means of crank 57 enables the person receiving to bring his motors into exact step with the motors of the distant transmitting set and thus properly position the received picture in his field of vision.

The rotor 50 is secured to a short tubular shaft 62 that carries at its outer end a disc 63 on which are mounted fan blades 64 that keep in action the gas within the housing and help in damping out light as hereinafter explained. The rotor 50 together with its fan preferably rotate in the opposite direction from the disc 61.

The disc 61 is provided with a plurality of light openings 65 corresponding in position to the slots 25 of disc 24, each of said light openings 65 preferably being formed in an opaque coating 66 on the surface of a glass disc 67 that is inserted or set into the disc 61. For the purpose of casting a light at the proper interval through the light openings 65 I provide, on the disc 61 a grounded electrode 68 and an insulated electrode 69 that are relatively positioned so that an electrical discharge or spark as indicated at 70 in Figs. 8 and 10 may be caused to take place directly over the light opening 65. Because the light will be most intense over the center of opening 65 the side walls of said opening are slightly convex leaving the area of the opening greater toward the ends so that the same amount of light will pass at the ends of the light slit 65 as at the center.

The insulated electrode 69 is in the form of a thin metal strip or bar secured at its center to the disc 61 as at 71 and secured at its outer end, Fig. 9, to said disc 61 by rivet 72 and insulator blocks 73. It will be understood that a plurality of the arms or bars 69 are provided on the disc 61 all of said arms except one being shown broken away in Fig. 5 and all of the electrodes 68 except one being removed in said figure. A contact member 74 is provided near the center of disc 61 to make electrical contact with the centers of electrodes 69 as the discs rotate and complete a circuit at the proper time interval the contact member 74 extends downwardly and is secured to the bottom of housing 15, Fig. 2, and is electrically connected with suitable radio receiving and amplifying devices so that the circuit through an electrode 69 is closed a spark of luminating qualities proportional to the received electromagnetic waves will be produced between electrodes 68 and 69 and will show as a line through slots in discs 59 and 61, across an imaginary picture field 75, shown by dotted lines in Fig. 1.

A multiplicity of lines of varying light intensity proportional to the received electromagnetic waves and therefore proportional to corresponding lines that were projected on the photo-electric cell of the sending apparatus will be projected in contiguous relation and will serve to reconstruct the picture.

The eyes of the observer will be located at E, Figs. 1, 11 and 12, so as to look into the receiving apparatus. The mirror 32 is silvered lightly on its back so that it will reflect an image upwardly but will yet permit a person to see through it. A partition 76 is disposed directly in rear of the mirror 32 to separate the lines of vision of the two eyes. A plate 77 having oval holes 78 therein, Fig. 1, is disposed between the partition plate 76 and the rotating discs 59 and 61 and color screens 79 are disposed over the respective holes 78 in the disc. The color screen over one hole 78 is red while the other color screen is blue so that said color screens cause the picture to appear as near as possible in the natural colors and further assist in bringing out the stereoscopic or third dimension effect. The mirror 32 is slidable within the housing so that it may be removed by grasping a handle 80 when only the receiving apparatus is used.

The space within the housing in which the electrodes 68 and 69 operate is filled with a gas, as carbon dioxide, best suited for producing a strong white light in response to the electrical discharge from the electrodes. The disc 61 that carries the electrodes 68 and 69 moves at a high rate of speed and the fan disc 63 with blades 64 moves at high speed in the opposite direction thus producing an instantly rapid movement of the gases past the electrodes and damping out the light from the electrical discharge as soon as the discharge ceases, the luminous gas being instantly removed from the scene of the light.

The received image is seen directly by the eyes at E which catch the image built up by the multiplicity of contiguous lines of light of varying intensity projected through the slits in discs 59 and 61 by the luminous discharges between electrodes 68 and 69 and reconstruct the picture. If desired the picture may be projected out onto a screen which may be positioned in front of the housing 15 and instead of being projected directly to the eyes.

From the preceding description it will be seen that the image of an object is projected onto the photo-electric cell in the form of a plurality of contiguous lines of light of varying intensity and that each line as it is projected on the cell will vary the conductivity of the cell thereby varying the electric current that will be transmitted through the cell and proportionately varying the strength of luminating intensity of the spark between the electrodes of the receiving apparatus thereby producing in said receiving apparatus a line corresponding in intensity to the line of light on the cell.

The foregoing description and accompanying drawings clearly disclose a preferred embodiment of my invention, but it will be understood that this disclosure is merely illustrative and that many changes may be made within the scope of the following claims.

I claim:

1. In a television device, a photo electric cell, means for projecting on said cell continuous traveling fluctuating light impressions and means adapted to eliminate recuperative effects from the said cell.

2. In a television device, the method of eliminating objectionable recuperative effects from a photo electric cell adapted to receive picture light impressions which consists in masking the wake of the picture light with a uniform light.

3. The combination in a television device having a photo electric cell, of means for projecting on said cell continuous traveling fluctuating picture light impressions, a scanning device and means adapted to remove objectionable recuperative effects from the cell.

4. In a television receiving device the combination, with moving means adapted to emit continuous, progressive, varying light fluctuations, of means adapted to instantaneously dampen the fluctuating emissions as soon as made.

5. In a television device the combination with a photo electric cell adapted to receive closely spaced lines of light traced by scanning pencils of light, of scanning means adapted to widely separate successive lines permitting recuperation of the effected portion of the cell before tracing overlapping lines.

6. In a device for receiving vision electrically, two members movable relative to each other, each provided with slots arranged to register to form a progressively moving opening, and means carried by one of said members for producing lights opposite the slots in said member by means of electrical discharges.

7. In a device for receiving vision electrically, two rotatable discs each provided with a plurality of slots that are adapted to register as said discs are rotated to progressively permit the passage of contiguous lines of light, and means carried by one of said discs in close proximity to said slots for providing illuminating proportional to received electromagnetic impulses.

8. In devices for receiving vision electrically, two rotating discs each provided with slots said slots being adapted to register and form rapidly moving openings through which light may be projected, electrodes carried by one of said discs, contact means connected with said electrodes and adapted to receive current that varies in proportion to variations in received electromagnetic waves, whereby when the circuits to said electrodes are energized an electrical discharge will occur between said electrodes and produce lights, and means for augmenting relative displacement between said electrodes and the gas in which they are disposed to damp out said lights.

9. In television devices of the class described, a movable photo electric cell, means for projecting a variable picture light onto said cell and means for projecting a blotting out light of substantially constant intensity onto said cell just to the rear of said variable picture light.

10. In television devices of the class described an annular rotating photo electric cell, means for passing an electric current through said cell, the electrical conductivity of said cell varying in proportion to the light that falls upon said cell, means for projecting a blotting out light of substantially constant intensity onto said cell and means for projecting the variable light derived by scanning an object onto said cell just preceding said blotting out light.

11. A method of producing a substantially uniform wake to a variable picture light, the image of which falls on a photo electric cell, which consists of projecting a light of substantially constant intensity onto said cell in the wake of said picture light.

12. In a television device, a photo electric cell, means for projecting a variable picture light onto said cell and means for projecting a light of substantially constant intensity onto said cell in the wake of said picture light, said cell and the images of said lights on said cell being relatively movable.

The foregoing specification signed at Seattle, Washington, this 4th day of February, 1928.

FRANK ELLISON BEST.